US008167197B2

(12) United States Patent
Kuroda et al.

(10) Patent No.: US 8,167,197 B2
(45) Date of Patent: May 1, 2012

(54) CONVERSION SYSTEM, TERMINAL AND METHOD FOR PAYING WITH E-MONEY (75) Inventors: Yuri Kuroda, Tokyo (JP); Hiroshi Tezuka, Tokyo (JP)

(73) Assignee: NEC Corporation, Tokyo (JP)

( * ) Notice: Subject to any disclaimer, the term of this patent is extended or adjusted under 35 U.S.C. 154(b) by 1022 days.

(21) Appl. No.: 11/493,003

(22) Filed: Jul. 26, 2006

(65) Prior Publication Data
US 2007/0023501 A1    Feb. 1, 2007

(30) Foreign Application Priority Data

Aug. 1, 2005    (JP) .................................. 2005-222583

(51) Int. Cl.
G06Q 40/00 (2012.01)
G07D 11/00 (2006.01)
G07F 19/00 (2006.01)
G06K 5/00 (2006.01)

(52) U.S. Cl. ........................... 235/379; 235/380; 705/39
(58) Field of Classification Search .................. 235/379, 235/375, 380; 705/14.27, 14.28, 14.31–14.33, 705/26.1, 35, 37, 39, 17, 41–43
See application file for complete search history.

(56) References Cited

U.S. PATENT DOCUMENTS

| | | | | |
|---|---|---|---|---|
| 5,937,396 A * | 8/1999 | Konya | ............................. | 705/43 |
| 5,963,647 A * | 10/1999 | Downing et al. | ................ | 705/39 |
| 6,213,390 B1 * | 4/2001 | Oneda | ........................... | 235/379 |
| 6,269,345 B1 * | 7/2001 | Riboud | ........................... | 705/35 |
| 7,104,440 B2 * | 9/2006 | Hansen et al. | ................ | 235/379 |
| 7,219,832 B2 * | 5/2007 | Fillinger et al. | ............... | 235/379 |
| 7,360,691 B2 * | 4/2008 | Takayama | ....................... | 235/380 |
| 2002/0153415 A1 * | 10/2002 | Minami et al. | ................ | 235/380 |
| 2003/0018577 A1 | 1/2003 | Fukushima et al. | | |
| 2003/0046234 A1 * | 3/2003 | Takadachi | ....................... | 705/43 |
| 2003/0236704 A1 * | 12/2003 | Antonucci | ....................... | 705/14 |
| 2004/0049423 A1 * | 3/2004 | Kawashima et al. | ........... | 705/14 |
| 2004/0153406 A1 * | 8/2004 | Alarcon-Luther et al. | ..... | 705/41 |
| 2004/0210530 A1 * | 10/2004 | Mitsumoto et al. | ............. | 705/42 |
| 2005/0144077 A1 * | 6/2005 | Takakura | ....................... | 705/14 |
| 2006/0059038 A1 * | 3/2006 | Iuchi et al. | ...................... | 705/14 |
| 2006/0118617 A1 * | 6/2006 | Matsumoto | .................... | 235/380 |

(Continued)

FOREIGN PATENT DOCUMENTS
EP      1 339 027 A1    1/2001
(Continued)

OTHER PUBLICATIONS

Japanese office action with English translation.

*Primary Examiner* — Michael G Lee
*Assistant Examiner* — Suezu Ellis
(74) *Attorney, Agent, or Firm* — Whitham Curtis Christofferson & Cook, PC (57) ABSTRACT

A conversion system includes a terminal apparatus for paying with one of a plurality of different types of e-money, and an intermediate server which issues intermediate e-money to the terminal apparatus. The terminal apparatus has an algorithm storage unit which stores an algorithm to convert intermediate money into one of said plurality of different types of e-money, and an e-money conversion unit to convert the intermediate e-money, which is different from the plurality of different types of e-money, into one of the plurality of different types of e-money.

11 Claims, 9 Drawing Sheets

U.S. PATENT DOCUMENTS

| | | | |
|---|---|---|---|
| 2007/0067237 A1* | 3/2007 | Snow et al. | 705/39 |
| 2007/0080209 A1* | 4/2007 | Fujita et al. | 235/380 |

FOREIGN PATENT DOCUMENTS

| | | |
|---|---|---|
| EP | 1 445 743 A1 | 5/2004 |
| JP | 09311891 A * | 12/1997 |
| JP | 11-203374 | 7/1999 |
| JP | 2002-024723 A | 1/2002 |
| JP | 2002-109429 | 4/2002 |
| JP | 2002-312731 | 10/2002 |
| JP | 2002-334285 A | 11/2002 |
| JP | 2004-213492 | 7/2004 |
| JP | 2004-234630 | 8/2004 |
| JP | 2004-272560 | 9/2004 |
| WO | WO 2004-066179 | 8/2004 |

* cited by examiner

… ommitted for brevity …

CONVERSION SYSTEM, TERMINAL AND METHOD FOR PAYING WITH E-MONEY

BACKGROUND OF THE INVENTION

The present invention relates to a technique of converting a kind of e-money into another kind of e-money.

There are currently a plurality of e-money service companies. Conventionally, use of e-money at a store is possible only in an e-money service company that has a contract with each store. For smooth shopping at all stores, contracts with a plurality of e-money service companies and holding of a plurality of cards are necessary. Hence, a technique of converting the type of e-money between a plurality of e-money service companies would be advantageous.

Japanese Patent Laid-Open No. 2002-334285 (reference 1) describes an example of e-money conversion technique. This prior art comprises a store information storage unit and an e-money conversion/sending unit. The store information storage unit stores a store information database including information of a store-designated money type that is designated by a store as the type of money acceptable by the store, and information of a store-designated money sending destination that is designated by the store as the money sending destination. The e-money conversion/sending unit converts e-money received from a store user into e-money corresponding to the store-designated money type in accordance with the store-designated money type information and sends the converted e-money to the store-designated money sending destination in accordance with the store-designated money sending destination information. Hence, the user can use the e-money for settlement at any virtual and real stores without being conscious of the type of e-money in possession.

Japanese Patent Laid-Open No. 2002-24723 (reference 2) describes another example of e-money conversion technique. This prior art comprises a user terminal to be used by a user U to use a plurality of kinds of prepaid-type e-money, and a prepaid-type e-money conversion server connected to the user terminal through the Internet. The prepaid-type e-money conversion server comprises a conversion unit that converts one of the plurality of kinds of prepaid-type e-money into another kind of prepaid-type e-money. With this arrangement, circulation routes can be integrated.

However, the conventional techniques require a centralized administration apparatus such as an e-money conversion server in order to convert e-money. For this reason, it is continuously necessary to install, maintain, and operate a server, resulting in cumbersomeness.

In addition, when e-money conversion is executed on the centralized administration apparatus side upon settlement, the payment processing cannot be executed if a terminal such as a cellular phone exists outside the radio wave reachable zone. In addition, every time the user purchases merchandise, the terminal needs to access the network. Hence, the settlement is time-consuming.

SUMMARY OF THE INVENTION

The present invention has been made to solve the above-described problems, and has as its object to allow a terminal side to easily convert e-money.

In order to achieve the above object, according to an aspect of the present invention, there is provided a conversion terminal comprising an algorithm storage unit which stores an algorithm to convert a type of e-money, an e-money acquisition unit which acquires one type of e-money, and an e-money conversion unit which converts the e-money acquired by the e-money acquisition unit into another type of e-money in accordance with the algorithm stored in the algorithm storage unit.

According to another aspect of the present invention, there is provided a conversion method comprising the steps of acquiring one type of e-money, and converting the acquired e-money into another type of e-money in accordance with a preset algorithm.

DESCRIPTION OF THE PREFERRED EMBODIMENTS

The first embodiment of the present invention will be described below in detail with reference to the accompanying drawings. The same reference numerals denote the same parts throughout the drawings.

Figure 1:
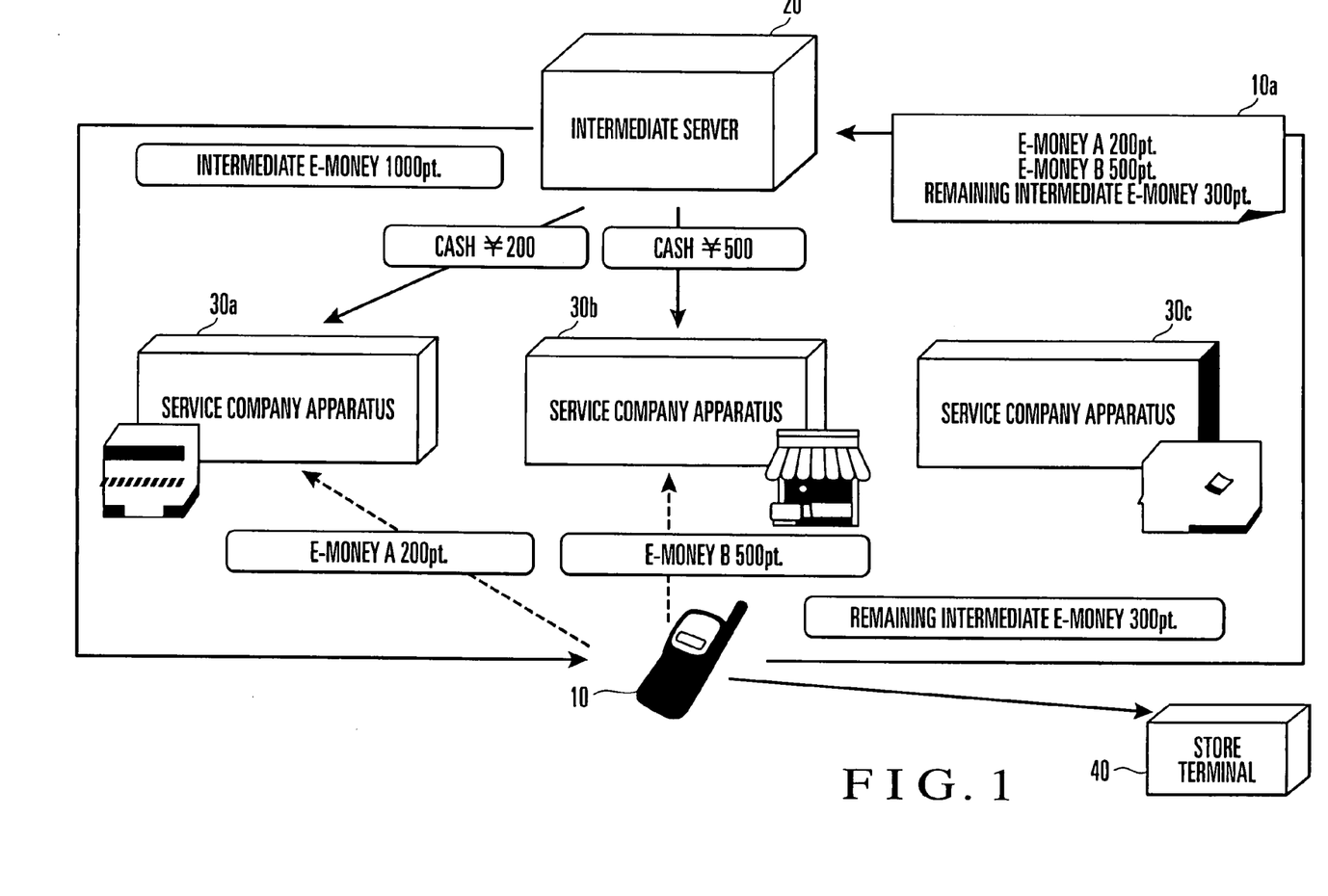
FIG. 1 is a schematic view showing the configuration of a conversion system according to the first embodiment of the present invention.

Referring to FIG. 1, a conversion system according to this embodiment includes a terminal apparatus (conversion terminal) 10, intermediate server (conversion server) 20, service company apparatuses 30 (30a, 30b, and 30c), and store terminal (conversion terminal) 40. The terminal apparatus 10, intermediate server 20, service company apparatuses 30, and store terminal 40 operate under the control of a program. The intermediate server 20 and service company apparatuses 30 are connected to each other through a network. This network can be arbitrary and include, e.g., an optical fiber, Internet, public line, LAN (Local Area Network), and ADSL (Asymmetric Digital Subscriber Line). The communication method can be either wired communication or wireless communication.

Figure 2:
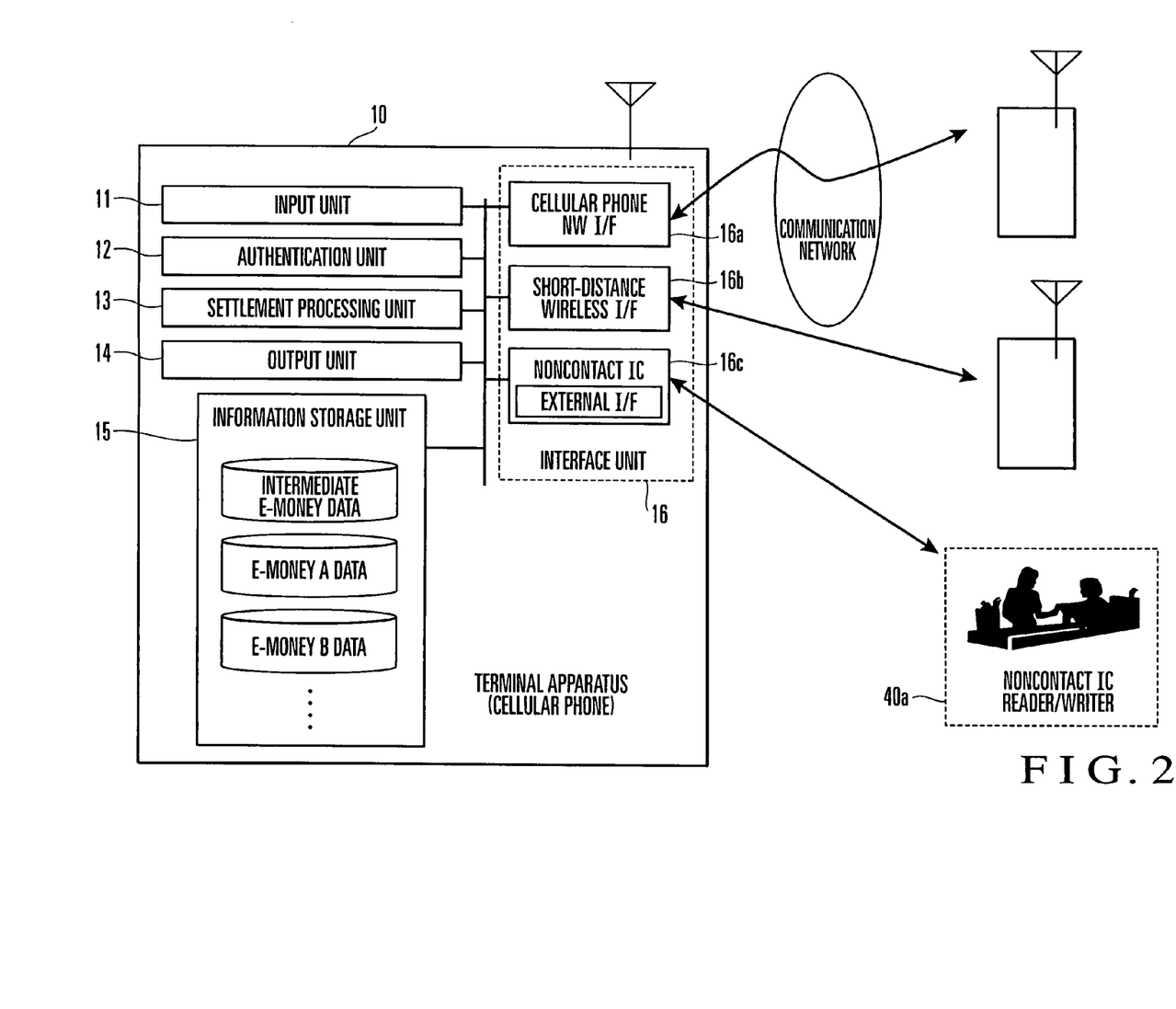
FIG. 2 is a block diagram showing the arrangement of a cellular phone as an example of a terminal apparatus according to the first embodiment of the present invention.

The terminal apparatus 10 is an information processing apparatus such as a cellular phone used by a user or can be a PDA or notebook computer. Referring to FIG. 2, the cellular phone as an example of the terminal apparatus 10 comprises an input unit (information setting unit) 11 used by a user to input various kinds of instructions, an authentication unit 12 to execute user authentication, a settlement processing unit 13 that converts intermediate e-money into various kinds of e-money and executes settlement, an output unit 14 to output data to the outside, an information storage unit 15 to store the use amount of intermediate e-money and use amounts of various kinds of e-money, and an interface unit 16 including a cellular phone network interface 16*a*, short-distance network interface 16*b*, and noncontact IC external interface 16*c*. The cellular phone also includes existing components such as a memory and a liquid crystal display unit, although not illustrated.

The output unit 14 exchanges data with another device through the interface 16.

Figure 3:
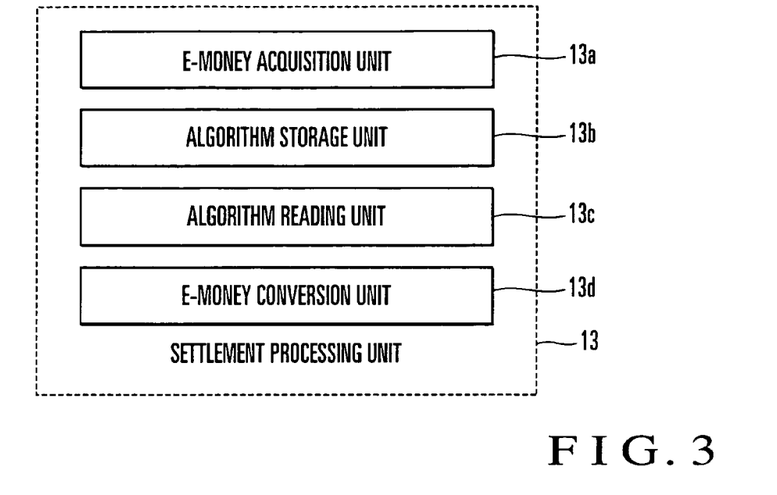
FIG. 3 is a block diagram showing an arrangement example of a settlement processing unit according to the first embodiment of the present invention.

As shown in FIG. 3, the settlement processing unit 13 comprises an e-money acquisition unit 13*a*, algorithm storage unit 13*b*, algorithm reading unit 13*c*, and e-money conversion unit 13*d*.

The e-money acquisition unit 13*a* acquires various kinds of e-money including intermediate e-money (to be described later).

The algorithm storage unit 13*b* stores an algorithm to convert a type of e-money. This algorithm contains a plurality of algorithms to convert a plurality of kinds of e-money into another kind of e-money.

The algorithm reading unit 13*c* reads out, from the algorithm storage unit 13*b*, the algorithm to convert a kind of e-money acquired by the e-money acquisition unit 13*a* into a type indicated by information set as will be described later.

The e-money conversion unit 13*d* converts the e-money acquired by the e-money acquisition unit 13*a* into another kind of e-money in accordance with the algorithm read out by the algorithm reading unit 13*c*.

A conversion rate database that stores a conversion rate referred to in e-money type conversion may be connected to the settlement processing unit 13.

The intermediate server 20 is an information processing apparatus such as a workstation server installed on the intermediate e-money service company side. The intermediate server 20 comprises an intermediate e-money management unit, settlement processing unit, operation input unit, ROM (Read Only Memory), RAM (Random Access Memory), communication interface, display unit, HD (Hard Disk), and CPU (Central Processing Unit). These components are connected by a bus. The intermediate server 20 issues intermediate e-money that can be converted into intermediate e-money of a plurality of kinds of e-money service companies. The issued intermediate e-money is converted in the terminal apparatus 10 into an e-money type usable at a store and used by the user for shopping at that store.

The intermediate e-money management unit has a function of managing the e-money balance and use log of each user.

The settlement processing unit has a function of executing settlement and payment of e-money used by each user for the service company apparatuses 30.

The operation input unit comprises a keyboard and mouse and outputs an operation signal corresponding to the operation of the keyboard and mouse to the CPU. The ROM stores a program to execute fundamental control of the components. The RAM is used as the work area of the CPU and temporarily stores a program to be executed by the CPU and various kinds of data.

The communication interface is connected to a network to control data communication with the terminal apparatus 10 and service company apparatuses 30. The display unit includes, e.g., a CRT (Cathode-Ray Tube) or LCD (Liquid Crystal Display).

The HD stores various kinds of software such as an operating system to control the intermediate server itself. The HD may also have a table storing information such as the e-money balance and use log of each user.

The service company apparatuses 30 are information processing apparatuses such as a personal computer installed on the e-money service company side and have a money processing module. The processing flows of deposit/withdrawal and movement of e-money are often individually defined. Processing is executed in accordance with procedures corresponding to the definition. The service company apparatus 30 also receive settlement/payment information from the intermediate server 20 and reflects it on the e-money system of its own.

The store terminal 40 is an information processing apparatus such as a checkout device installed at a store where the user buys merchandise. The store terminal 40 has a function of receiving settlement processing by e-money from the terminal apparatus 10 and executing the processing.

Conversion from intermediate e-money into e-money will be described next with reference to FIG. 4 by exemplifying a user A, i.e., one of registered users.

Assume that the user A wants to buy a merchandise item of 200 pt on the store terminal 40. E-money usable on the store terminal 40 is e-money A. The user A has only cash of 1,000 yen and cannot buy the merchandise item of 200 pt in the existing circumstances (S31).

The user A requests the intermediate server 20 to charge intermediate e-money of 1,000 pt from the e-money acquisition unit 13*a* of the settlement processing unit 13 of the terminal apparatus 10 in exchange for the cash. Upon receiving the charge request, the intermediate server 20 charges intermediate e-money of 1,000 pt (S32). At this time, the e-money acquisition unit 13*a* of the terminal apparatus 10 adds 1,000 pt to the balance of intermediate e-money in the information storage unit 15.

The user A sets, from the input unit 11 of the terminal apparatus 10, information about the type of e-money A usable on the store terminal 40. The algorithm reading unit 13*c* of the settlement processing unit 13 of the terminal apparatus 10 reads out, from the algorithm storage unit 13*b*, the algorithm to convert the intermediate e-money into the e-money A. In accordance with this algorithm, the e-money conversion unit 13*d* converts intermediate e-money of 200 pt into the e-money A to buy the merchandise item. At this time, the balance of intermediate e-money in the information storage unit 15 is subtracted by 200 pt to 800 pt. The e-money A of 200 pt is added to the store terminal 40 (S33).

The settlement processing unit 13 of the terminal apparatus 10 transmits an intermediate e-money use amount report 10*a* to the intermediate server 20 to request settlement. The intermediate server 20 executes settlement for the service company apparatus 30. The service company apparatus 30 executes settlement for the store terminal 40.

In this way, when the difference in e-money standard is absorbed by the intermediate e-money, the user A can do the shopping on the plurality of store terminals 40 that require different kinds of e-money.

In this embodiment, intermediate e-money different from e-money issued by each e-money service company is newly created as intermediate e-money. However, the intermediate e-money need not always be created. The same operation and effect can be obtained by, e.g., handling the e-money A as intermediate e-money.

Figure 5:
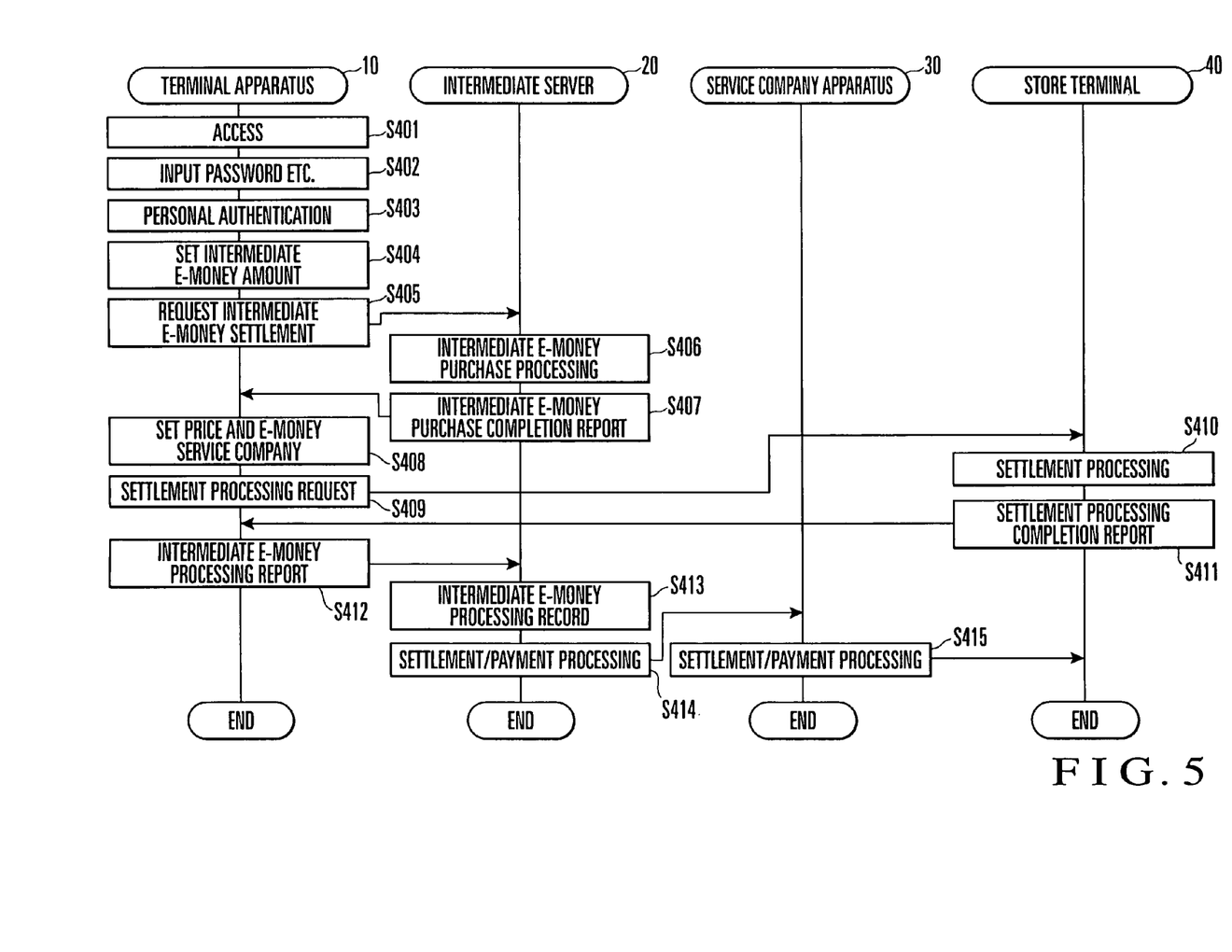
FIG. 5 is a sequence chart showing a conversion processing operation according to the first embodiment of the present invention.

The flow of conversion processing using intermediate e-money according to this embodiment will be described next with reference to FIG. 5.

At the start of access of the terminal apparatus 10 to the intermediate server 20 (S401), the input unit 11 of the terminal apparatus 10 receives input of a password and the like from the user (S402).

The authentication unit 12 of the terminal apparatus 10 executes personal authentication on the basis of the received password to determine whether the user is authentic (S403). Personal authentication may be done by the intermediate server 20 or store terminal 40.

When personal authentication is ended, the terminal apparatus 10 receives input of setting of an intermediate e-money charge request amount from the input unit 11 (S404).

The settlement processing unit 13 of the terminal apparatus 10 accesses the intermediate server 20 to request settlement of intermediate e-money, i.e., charge of intermediate e-money (S405).

The settlement processing unit of the intermediate server 20 executes intermediate e-money issue processing in response to the intermediate e-money purchase request (S406). The intermediate e-money is charged through an existing communication network. The intermediate e-money can also be charged from a noncontact IC reader/writer 40a at a store or from an ATM installed outdoors or indoors.

After the intermediate e-money issue processing, the settlement processing unit of the intermediate server 20 reports the completion of intermediate e-money purchase to the terminal apparatus 10 (S407).

When buying a merchandise item at a store, the terminal apparatus 10 sets information about the price of the merchandise item and the e-money service company of e-money used at that store (S408). With this processing, the intermediate e-money can be converted into specific e-money. The information about the amount and e-money service company may be set manually by the user through the input unit 11 of the terminal apparatus 10. Alternatively, information displayed at the store may automatically be read by the terminal apparatus 10 and processed.

The terminal apparatus 10 issues, to the store terminal 40, a settlement processing request together with the information set in step S408 (S409). At this time, a noncontact IC reader/writer function may be used.

The store terminal 40 executes settlement processing, receives the intermediate e-money of the terminal apparatus 10 as specific e-money (S410), and reports the completion of settlement processing to the terminal apparatus 10 (S411).

The terminal apparatus 10 reports processing upon using the intermediate e-money to the intermediate server 20 (S412).

The intermediate server 20 stores the processing upon using the intermediate e-money in the table in the HD, which stores information about the e-money balance and use log of each user (S413).

Finally, settlement/payment processing of purchase using the intermediate e-money is done in the intermediate server 20, service company apparatus 30, and store terminal 40 (S414 and S415). When the purchase log is polled from the intermediate server 20 to the terminal apparatus 10 of the user, and the intermediate server 20 manages the purchase log or settlement log, cash corresponding to the amount used by the user is paid from the intermediate server 20 to the service company apparatus 30. The purchase log can also be polled from the terminal apparatus 10 to the intermediate server 20. The store terminal 40 may report the user purchase log to the intermediate server 20 by a predetermined method.

Assume that an organization called an intermediate e-money service company such as a bank that issues, manages, and changes virtual e-money exists in addition to existing e-money service companies. The user buys intermediate e-money from the intermediate e-money service company. At stores provided by a plurality of e-money service companies, the user converts the intermediate e-money into a kind of e-money suitable for each store and use it. Every time the user uses the intermediate e-money or at a predetermined period, the intermediate e-money service company executes report and payment of the used amount for each e-money service company. The present invention can be applied to the above-described operation form.

According to this embodiment, e-money services provided by a plurality of e-money service companies can be used on the same terminal apparatus without any change on the store terminal.

If the user has lost the terminal apparatus, he/she can report it to the intermediate server and lock access. Hence, the security is high, and reissue is possible.

Because of the high convenience and security, the apparatus can be used as a settlement means for auction and Internet shopping.

Conventionally, a centralized administration apparatus such as an e-money conversion server is necessary for e-money conversion. According to this embodiment, e-money conversion can easily be done by the terminal apparatus 10. In addition, even if the terminal apparatus 10 is present outside the radio wave reachable zone, settlement processing can be executed. Furthermore, the terminal apparatus 10 need not access the network every time the user purchases merchandize. Hence, the time required for settlement can be shortened.

The second embodiment of the present invention will be described next in detail with reference to the accompanying drawings. In this embodiment, e-money transfer between individuals through the same service company or different service companies is enabled by exchanging intermediate e-money or e-money between terminals. The same reference numerals denote the same parts throughout the drawings.

Figure 6:
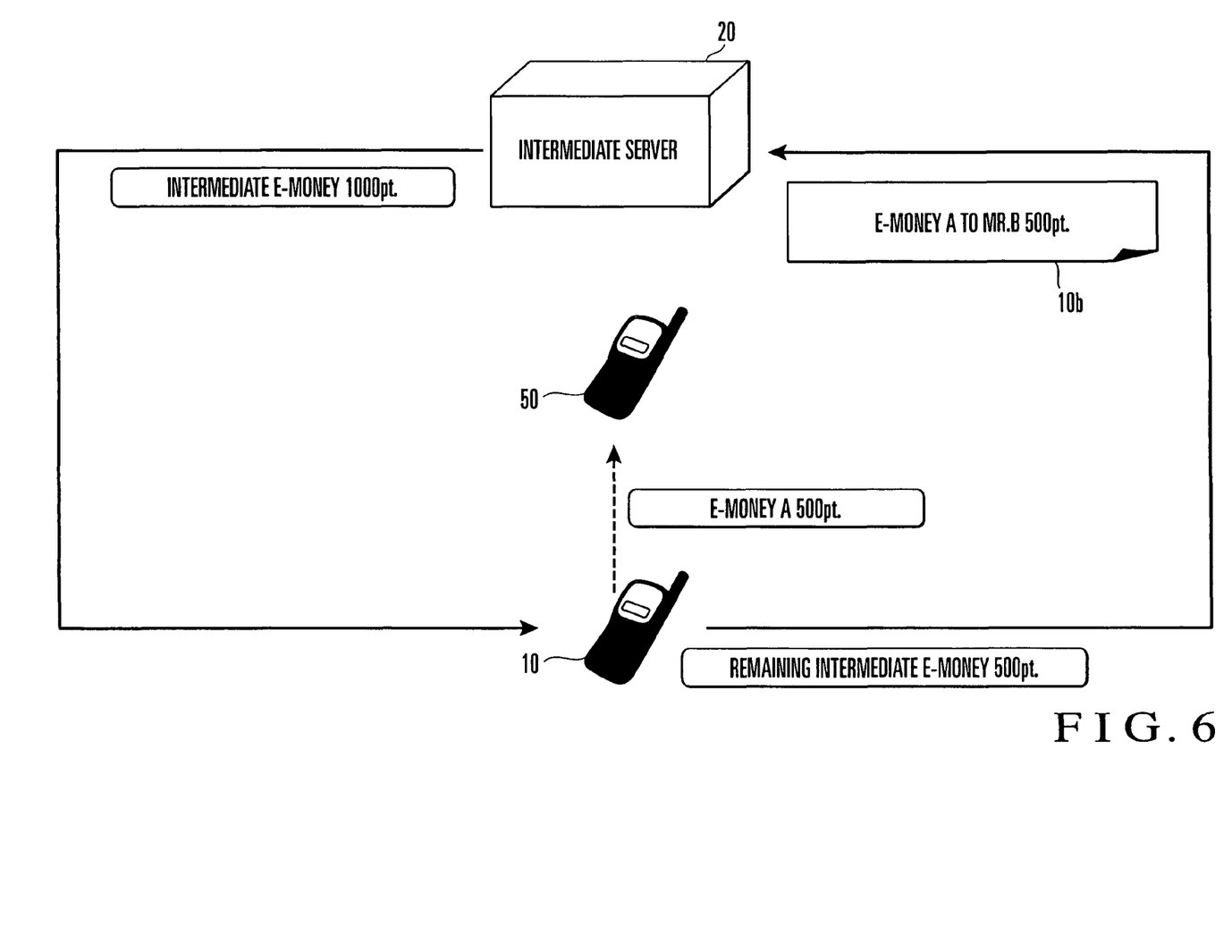
FIG. 6 is a schematic view showing the configuration of a conversion system according to the second embodiment of the present invention.

Referring to FIG. 6, the conversion system according to this embodiment includes a terminal apparatus 10, intermediate server 20, and terminal apparatus 50. The terminal apparatus 10, intermediate server 20, and terminal apparatus 50 operate under the control of a program. The terminal apparatus 10, intermediate server 20, and terminal apparatus 50 are connected to each other through a network. This network can be arbitrary and include, e.g., an optical fiber, Internet, public line, LAN (Local Area Network), and ADSL (Asymmetric Digital Subscriber Line). The communication method can be either wired communication or wireless communication.

Figure 7:
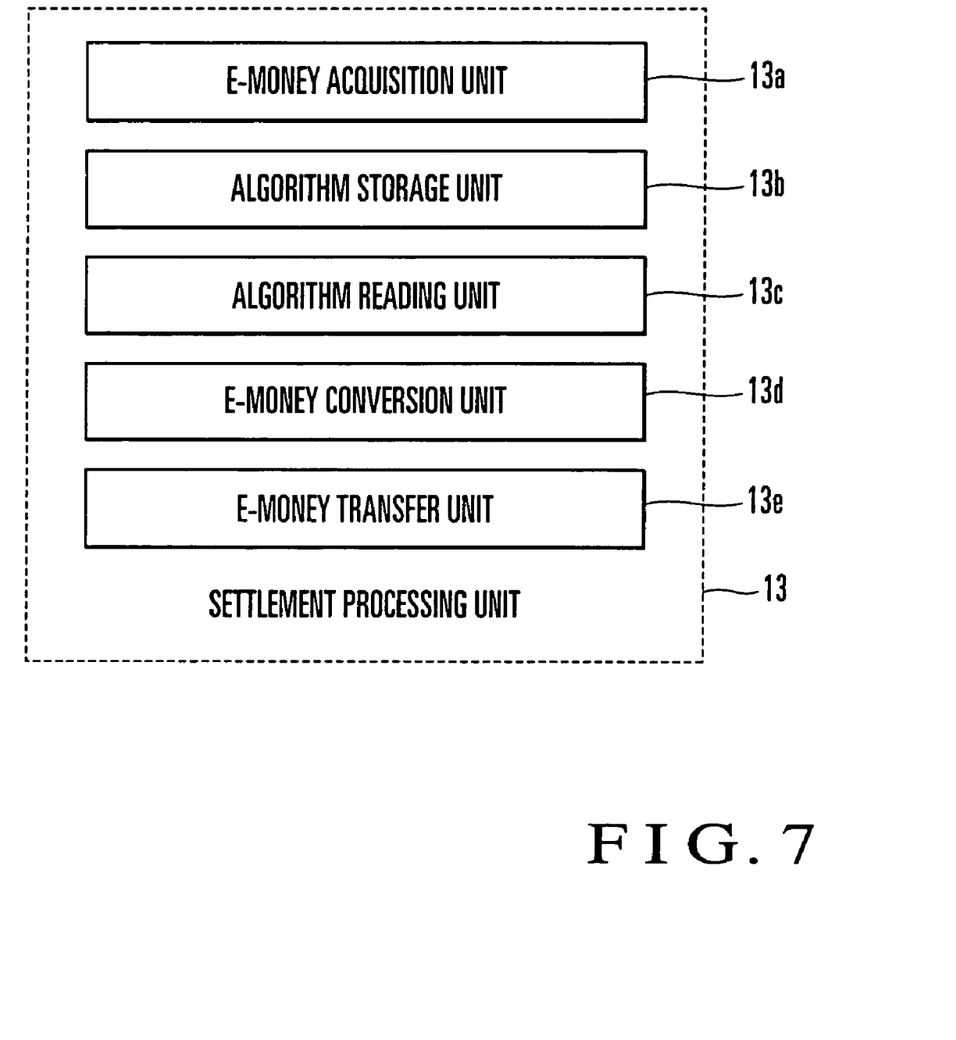
FIG. 7 is a block diagram showing an arrangement example of a settlement processing unit according to the second embodiment of the present invention.

The fundamental arrangement of the terminal apparatuses 10 and 50 is almost the same as that of the terminal apparatus 10 of the above-described first embodiment. As shown in FIG. 7, a settlement processing unit 13 in each of the terminal apparatuses 10 and 50 further comprises an e-money transfer unit 13e in addition to an e-money acquisition unit 13a, algorithm storage unit 13b, algorithm reading unit 13c, and e-money conversion unit 13d. The e-money transfer unit 13e exchanges e-money with another terminal apparatus.

The fundamental arrangement of the intermediate server 20 is the same as in the above-described first embodiment, and a repetitive description will be omitted.

Figure 8:
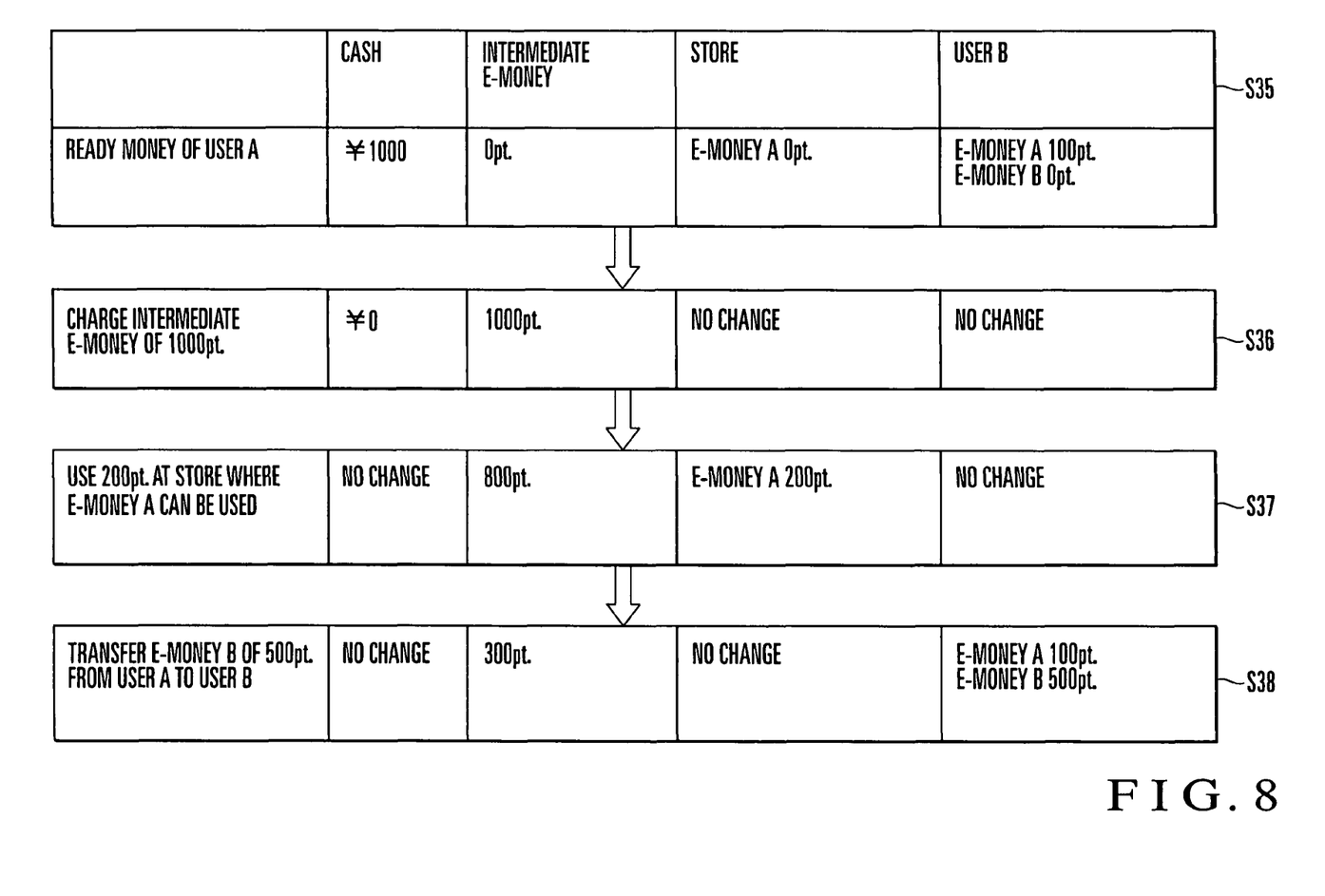
FIG. 8 is a view showing changes of intermediate e-money according to the second embodiment of the present invention.

E-money conversion between individuals will be described next with reference to FIG. 8 by exemplifying users A and B, i.e., registered users.

The user A has only cash of 1,000 yen, and the user B has e-money A of 100 pt but no e-money B (S35). The user A requests the intermediate server 20 to charge intermediate e-money of 1,000 pt from the e-money acquisition unit 13a of the settlement processing unit 13 of the terminal apparatus 10 in exchange for the cash. Upon receiving the charge request, the intermediate server 20 charges intermediate e-money of 1,000 pt (S36). At this time, the e-money acquisition unit 13a of the terminal apparatus 10 adds 1,000 pt to the balance of intermediate e-money in an information storage unit 15.

When the user A buys a merchandise item on a store terminal 40 by using the intermediate e-money of 200 pt as the e-money A, the balance of intermediate e-money reduces to 800 pt (S37).

The user A wants to transfer the e-money B of 500 pt to the user B. The user A sets, from an input unit 11 of the terminal apparatus 10, information about the type of e-money B to be transferred to the user B. The algorithm reading unit 13c of the settlement processing unit 13 of the terminal apparatus 10 reads out, from the algorithm storage unit 13b, the algorithm to convert the intermediate e-money into the e-money B. In accordance with this algorithm, the e-money conversion unit 13d converts intermediate e-money of 500 pt into the e-money B.

The e-money transfer unit 13e of the terminal apparatus 10 transmits an intermediate e-money use amount report 10b to the intermediate server 20 to request settlement. The intermediate server 20 executes settlement for the terminal apparatus 50 of the user B. With this processing, the e-money B of 500 pt converted by the terminal apparatus 10 of the user A is transferred to the terminal apparatus 50 of the user B. At this time, the balance of intermediate e-money in the information storage unit 15 of the terminal apparatus 10 is subtracted by 500 pt to 300 pt. On the other hand, the balance of e-money B in the information storage unit 15 of the terminal apparatus 50 increases by 500 pt to 500 pt (S38).

Intermediate e-money may be transferred from the terminal apparatus 10 of the user A to the terminal apparatus 50 of the user B, and conversion from the intermediate e-money to the e-money B may be done in the terminal apparatus 50.

In this way, when the difference in e-money standard is absorbed by the intermediate e-money, e-money can be exchanged between the users A and B.

In this embodiment, intermediate e-money different from e-money issued by each e-money service company is newly created as intermediate e-money. However, the intermediate e-money need not always be created. The same operation and effect can be obtained by, e.g., handling predetermined e-money as intermediate e-money.

Figure 9:
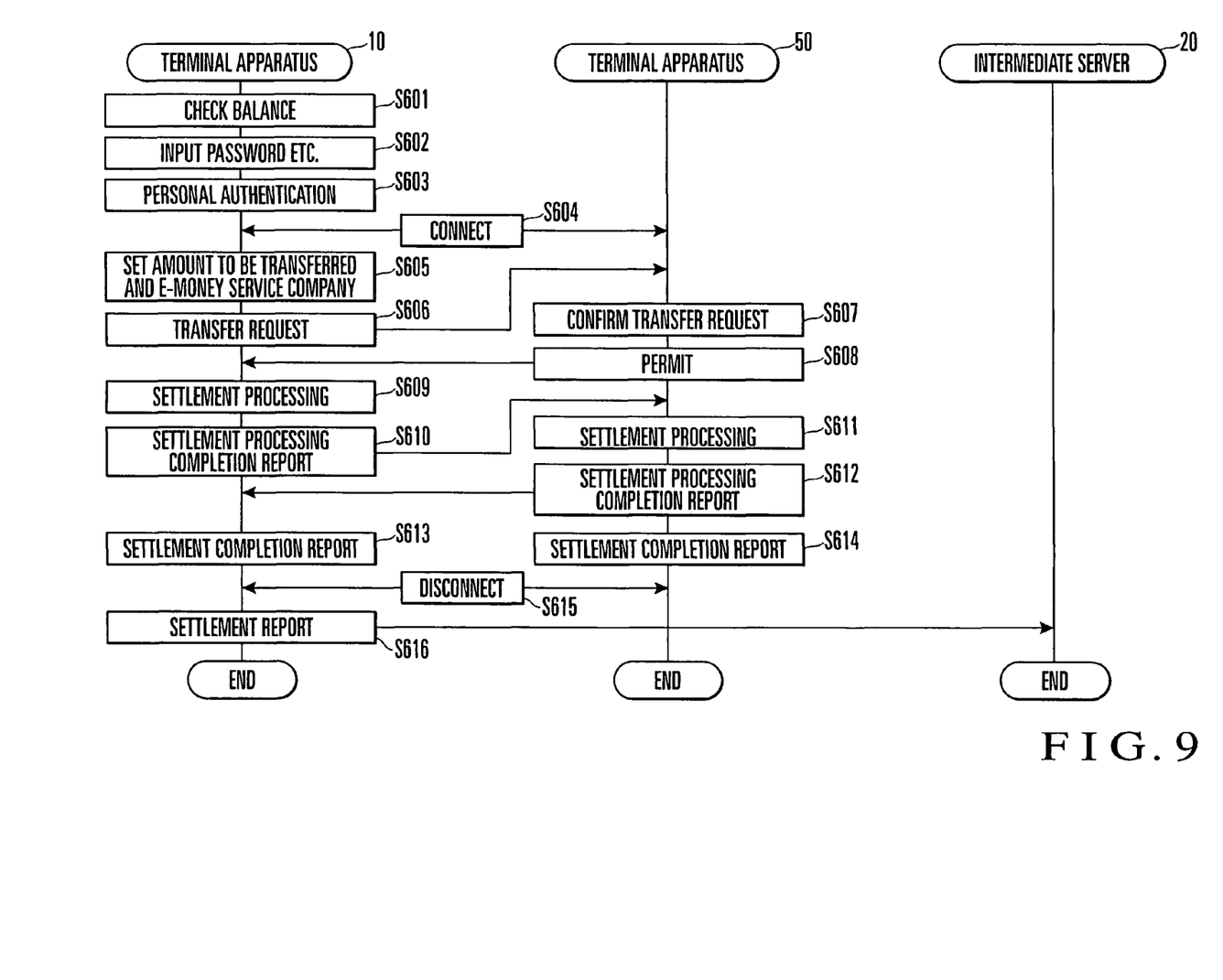
FIG. 9 is a sequence chart showing a conversion processing operation according to the second embodiment of the present invention.

The flow of conversion processing using intermediate e-money according to this embodiment will be described next with reference to FIG. 9.

To check the balances of various kinds of e-money (S601), the input unit 11 of the terminal apparatus 10 receives input of a password and the like from the user (S602).

The terminal apparatus 10 executes personal authentication on the basis of the received password to determine whether the user is authentic (S603). Personal authentication may be done by the intermediate server 20.

After authentication, the terminal apparatus 10 starts connecting to the terminal apparatus 50 (S604).

The terminal apparatus 10 sets, from the input unit 11, information about the amount to be transferred to the terminal apparatus 50 and the e-money service company of e-money (S605). With this processing, conversion of intermediate e-money into specific e-money becomes possible. Intermediate e-money exchange can be done between personal portable terminals. Exchange of the same kind of e-money provided by the same service company is also possible.

The terminal apparatus 10 issues, to the terminal apparatus 50, a transfer request together with the information set in step S605 (S606). A communication network is used for settlement of intermediate e-money between the terminals. At this time, a communication function such as Bluetooth or RFID provided on the terminal apparatus 10 may be used.

The terminal apparatus 50 confirms the transfer request (S607) and issues a permission to the terminal apparatus 10 (S608).

The terminal apparatus 10 executes settlement processing (S609) and reports the completion of settlement processing to the terminal apparatus 50 (S610).

The terminal apparatus 50 also executes settlement processing (S611) and reports the completion of settlement processing to the terminal apparatus 10 (S612).

The terminal apparatuses 10 and 50 confirm settlement processing (S613 and S614) and disconnect from each other (S615). The intermediate e-money can be converted into cash.

The terminal apparatus 10 reports the settlement processing to the intermediate server 20. The intermediate server 20 stores the processing upon using the intermediate e-money in the table in the HD, which stores information about the e-money balance and use log of each user (S616).

According to this embodiment, e-money exchange. between individuals can be done between terminal apparatuses. In addition, e-money or intermediate e-money can be converted into cash.

The third embodiment of the present invention will be described next. The third embodiment is different from the above-described first embodiment in that the intermediate server 20 is unnecessary. More specifically, the processing of the intermediate server 20 is implemented by a terminal apparatus 10 using predetermined software and a conversion table storing e-money conversion rate.

In this arrangement, the concept of intermediate e-money need not always be used.

The fourth embodiment of the present invention will be described next. The fourth embodiment is different from the above-described second embodiment in that the intermediate server 20 is unnecessary. More specifically, the processing of the intermediate server 20 is implemented by a terminal apparatus 10 using predetermined software and a conversion table storing e-money conversion rate.

In this arrangement, the concept of intermediate e-money need not always be used.

Figure 10:
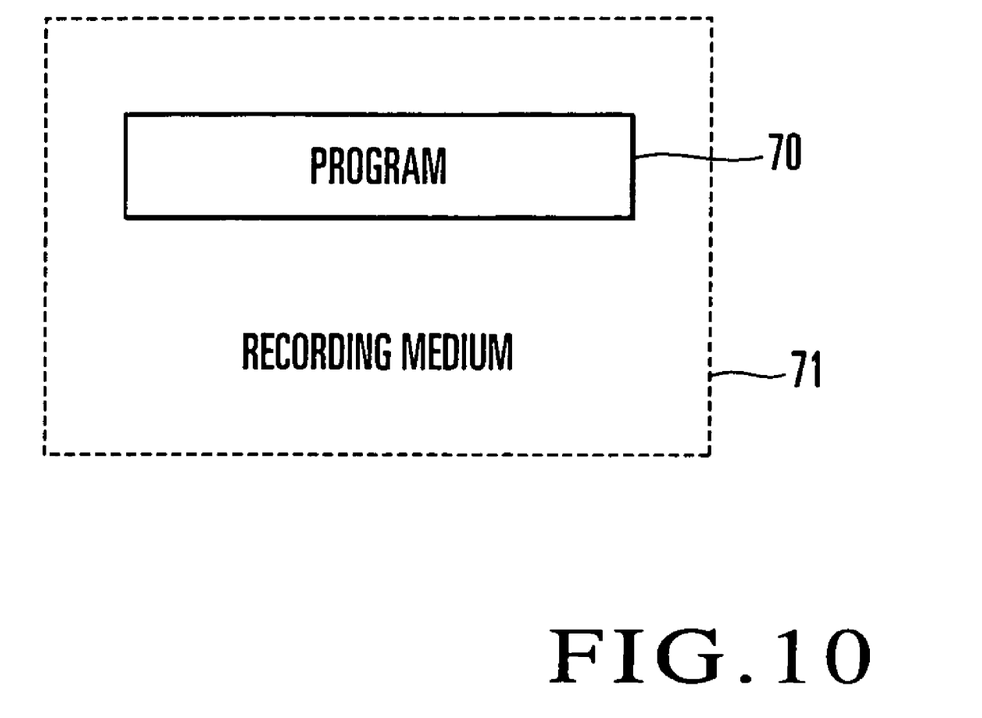
FIG. 10 is a view showing a recording medium that stores a program to implement the functions of the constituent elements according to the present invention.

The above-described embodiments are preferable embodiments of the present invention, and various changes and modifications can be made within the spirit and.-scope of the present invention. For example, processing of implementing the functions of the respective apparatuses may be executed by causing each apparatus to read and execute a program 70 to implement the functions of the terminal apparatus 10, intermediate server 20, service company apparatus 30, and store terminal 40 of the above-described embodiments. The program 70 may be transmitted to another computer system through a CD-ROM or magnetooptical disk serving as a computer-readable recording medium 71 shown in FIG. 10 or by a carrier through the Internet or telephone line serving as a transmission medium.

In the above embodiments, a system configuration in which the terminal apparatus 10, intermediate server 20, service company apparatus 30, and store terminal 40 are separately connected has been described. However, the present invention can also be applied to a configuration in which each function is implemented as one computer system or a configuration in which a plurality of apparatuses are added for each function.

Figure 4:
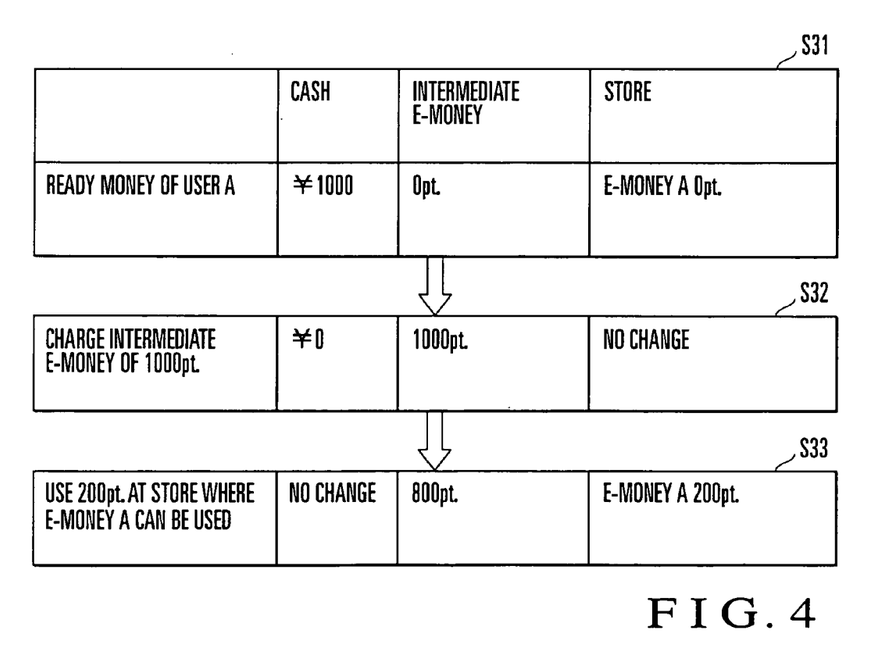
FIG. 4 is a view showing changes of intermediate e-money according to the first embodiment of the present invention.

In the above-described embodiments, a cellular carrier or broadband carrier may serve as the intermediate e-money service company that operates the intermediate server 20 and request payment of e-money (e.g., payment of intermediate e-money charged in step S32 in FIG. 4) simultaneously upon requesting payment of fees for telephone calls and communication or payment by credit card (for the cellular phone fee). Alternatively, the intermediate e-money service company may commission a cellular carrier or broadband carrier to do e-money billing for the service company.

What is claimed is:

1. A conversion terminal to pay with e-money issued by one or more e-money service companies comprising:
    an algorithm storage unit which stores an algorithm to convert an intemiediate e-money into one of a plurality of different types of e-money, whereby said intermediate e-money is different from said plurality of different types of e-money and is not issued by said one or more e-money service companies, and said intermediate e-money cannot be used directly to procure goods and services anywhere and may only be converted to one or more of said plurality of different types of e-money to procure goods and services;
    an e-money acquisition unit which acquires said intermediate e-money that can be converted into said one of said plurality of different types of e-money;
    an e-money conversion unit which converts said intermediate e-money acquired by said e-money acquisition unit into said one of said plurality of different types of e-money in accordance with the algorithm stored in said algorithm storage unit and then pays the converted e-money to a store terminal whereat the converted e-money is usable to thereby request the store terminal to execute settlement processing; and
    a settlement processing unit which, based on a completion report of the settlement processing from said store terminal, transmits to an intermediate server issuing said intermediate e-money a report that the settlement processing has been executed when said intermediate e-money has been used.

2. A terminal according to claim 1, further comprising:
    an information setting unit which sets information about said one of said plurality of different types of e-money before conversion by a user; and
    an algorithm reading unit which reads out, from said algorithm storage unit, said algorithm to convert said intermediate e-money acquired by said e-money acquisition unit into said one of said plurality of different types of e-money represented by the information set by said information setting unit, wherein said e-money conversion unit converts the intermediate e-money in accordance with the algorithm read out by said algorithm reading unit.

3. A terminal according to claim 1, further comprising an e-money transfer unit which is arranged to exchange said one of said plurality of different types of e-money converted by said e-money conversion unit with another conversion terminal.

4. A conversion system comprising:
    an intermediate server which issues intermediate e-money that can be converted into one of a plurality of different types of e-money issued by one or more e-money service companies, whereby said intermediate e-money is different from said plurality of different e-money and is not issued by said one or more e-money service companies, and said intermediate e-money cannot be used directly to procure goods and services anywhere and may only be converted to one or more of said plurality of different types of e-money to procure goods and services;
    a terminal apparatus for paying with said one of said plurality of different types of e-money comprising:
        an algorithm storage unit which stores an algorithm to convert said intermediate e-money into said one of said plurality of different types of e-money;
        an e-money acquisition unit which acquires said intermediate e-money from said intermediate server;
        an e-money conversion unit which converts said intermediate e-money acquired by said e-money acquisition unit from said intermediate server into said one of said plurality of different types of e-money in accordance with the algorithm stored in said algorithm storage unit and then pays the converted e-money to a store terminal whereat the converted e-money is usable to thereby request the store terminal to execute settlement processing of a purchase trade; and
        a settlement processing unit which, based on a completion report of the settlement processing from said store terminal, transmits to said intermediate server issuing said intermediate e-money a report that the settlement processing has been executed when said intermediate e-money has been used,
    wherein when said intermediate server receives the report from said terminal apparatus, the purchase trade using said intermediate e-money is subjected to settlement processing among said intermediate server, an e-money service company issuing the converted e-money, and said store terminal.

5. A system according to claim 4, wherein said terminal apparatus further comprises
    an information setting unit which sets information about said one of said plurality of different types of e-money used on said store terminal by a user, and
    an algorithm reading unit which reads out, from said algorithm storage unit, said algorithm to convert said intermediate e-money acquired by said e-money acquisition unit into said one of said plurality of different types of e-money represented by the information set by said information setting unit, wherein said e-money conversion unit converts the intermediate e-money into said one of said plurality of different types of e-money in accordance with the algorithm read out by said algorithm reading unit.

6. A system according to claim 4, wherein said terminal apparatus further comprises an e-money transfer unit which exchanges the said one of said plurality of different types of e-money converted by said e-money conversion unit with another terminal apparatus.

7. An intermediate server which issues, to a terminal apparatus, intermediate e-money that can be converted into one of a plurality of different types of e-money issued by one or more e-money service companies, whereby said intermediate e-money is different from said plurality of different e-money and is not issued by said one or more e-money service companies, and said intermediate e-money cannot be used directly to procure goods and services anywhere and may only be converted to one or more of said plurality of different types of e-money to procure goods and services, wherein when said intermediate server receives a report from said terminal apparatus, a purchase trade using said intermediate e-money is subjected to settlement processing among said intermediate server, an e-money service company issuing the converted e-money, and a store terminal.

8. A conversion method for paying with e-money issued by one or more e-money service companies comprising the steps of:

acquiring intermediate e-money by at least one conversion terminal arranged to pay with said e-money, converting said acquired intermediate e-money into one of a plurality of different types of e-money by a conversion unit in said at least one conversion terminal in accordance with a converting algorithm stored in an algorithm storage unit in said at least one conversion terminal, whereby said intermediate e-money is different from said plurality of different types of e-money and is not issued by said one or more e-money service companies, and said intermediate e-money cannot be used directly to procure goods and services anywhere and may only be converted to one or more of said plurality of different types of e-money to procure goods and services, paying the converted e-money to a store terminal whereat the converted e-money is usable;

requesting the store terminal to execute settlement processing; and transmitting a completion report of the settlement processing from said store terminal to an intermediate server issuing said intermediate e-money a report that the settlement processing has been executed when said intermediate e-money has been used.

9. A method according to claim 8, further comprising the step of setting information by a user about said one of said plurality of different types of e-money before the conversion by an information setting unit comprised in said conversion terminal, wherein at the converting step, the intermediate e-money is converted in accordance with said converting algorithm into said one of said different types of e-money represented by the set information.

10. A method according to claim 8, further comprising the step of exchanging the converted e-money by an e-money transfer unit comprised in said conversion terminal with another conversion terminal.

11. A conversion method comprising the steps of:

issuing intermediate e-money which can be converted into a plurality of different types of e-money to a terminal apparatus by an intermediate server, wherein said intermediate e-money is different from said plurality of different types of e-money and is not issued by one or more e-money service companies which issue said plurality of different types of e-money, and said intermediate e-money cannot be used directly to procure goods and services anywhere and may only be converted to one or more of said plurality of different types of e-money to procure goods and services, and converting said intermediate money to at least one of said plurality of different types of e-money, wherein when said intermediate server receives a report from said terminal apparatus, a purchase trade using said intermediate e-money is subjected to settlement processing among said intermediate server, an e-money service company issuing the converted e-money, and a store terminal.

* * * * *